March 19, 1940. W. E. GREENAWALT 2,194,454
METALLURGICAL PROCESS AND APPARATUS
Filed Sept. 3, 1936 3 Sheets-Sheet 2

INVENTOR.
William E. Greenawalt

Patented Mar. 19, 1940

2,194,454

UNITED STATES PATENT OFFICE 2,194,454

METALLURGICAL PROCESS AND APPARATUS

William E. Greenawalt, Denver, Colo.

Application September 3, 1936, Serial No. 99,192

23 Claims. (Cl. 75—74)

My invention relates, broadly, to metallurgical processes, but more particularly to processes for treating finely divided ore, as for example, gravity or flotation concentrates.

Most of the non-ferrous ores, as mined, such as those of copper, gold and silver, and zinc, are finely ground and subjected to gravity or flotation concentration. The resulting concentrate is fine, and usually high in sulphur. Roasting and smelting of this concentrate presents something of a problem. Roasting of very fine material in hearth furnaces is rather slow, because the air does not readily penetrate into the mass of fines, even if frequently stirred, and the dust, in roasting, especially in multiple hearth furnaces, is excessive.

Multiple hearth furnaces are now almost universally used in roasting fine ore. They are complicated and expensive to install and operate. The hot ore, showering through six or seven dropholes, against a strong ascending current of furnace gas, flashes to a high temperature, and the hot and strong counter-current furnace gas produces a large amount of dust, which has to be settled or precipitated, and collected for further treatment. Furthemore, in the ordinary roasting processes, which are usually separated from the subsequent process, the hot ore is cooled, and the heat so lost has to be supplied in the smelting furnace at additional expense of fuel, with a correspondingly reduced furnace capacity, and the excess of combustion gas creates a strong draft through the smelting furnace which causes a correspondingly increased amount of smelter dust.

Figure 1:
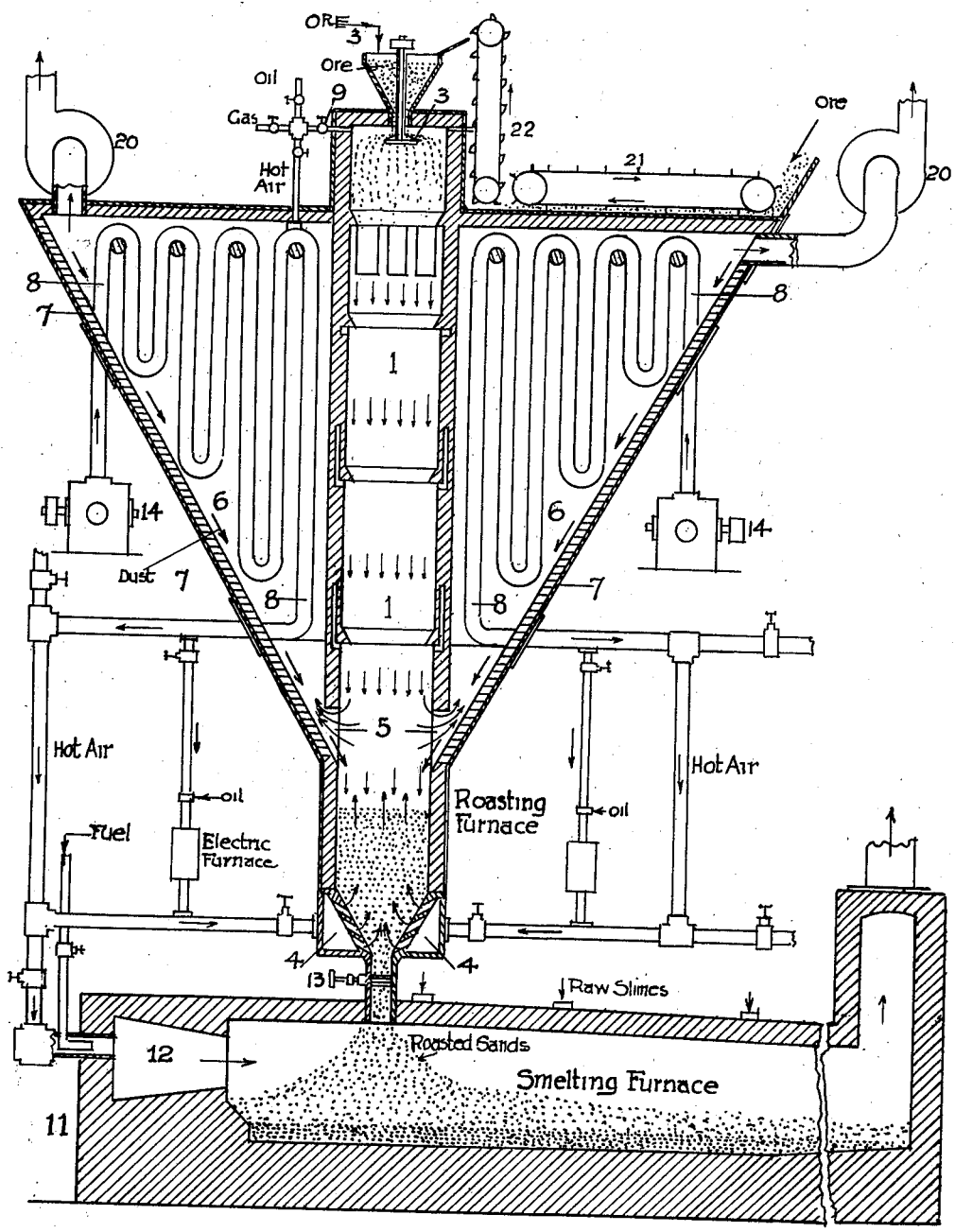
Figure 2:
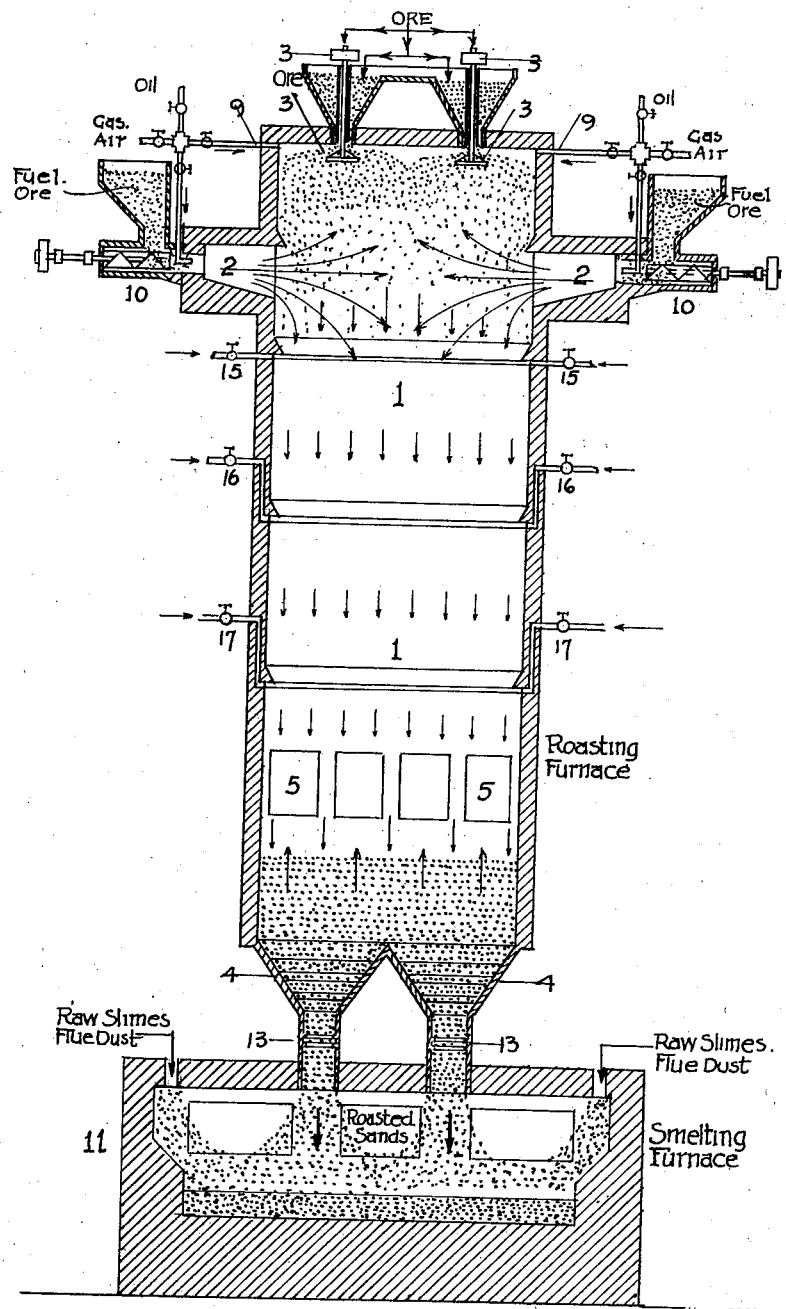
Figure 3:
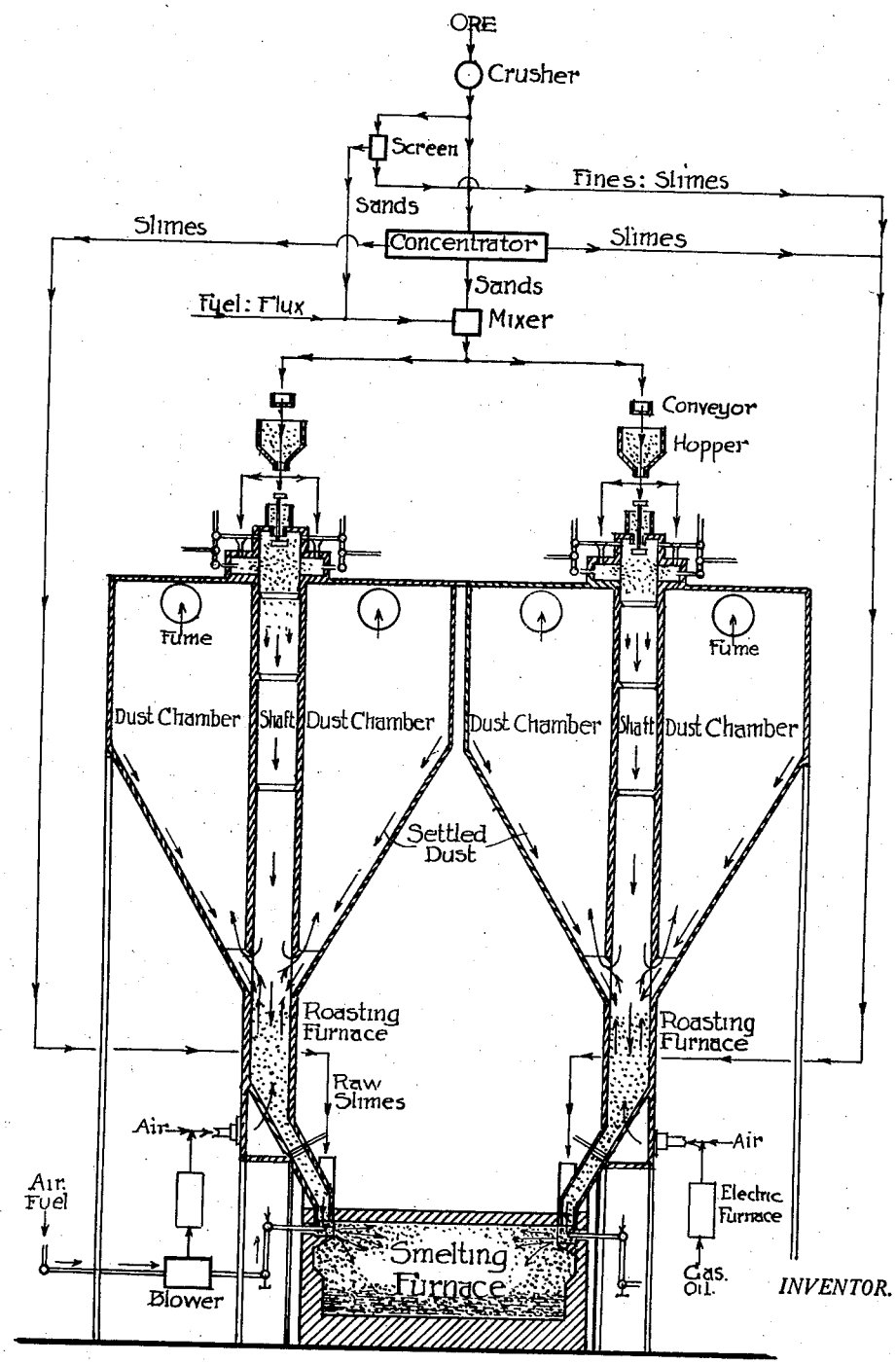

One of the objects of this invention is to simplify this procedure. The process will now be described in detail as applied to copper ores, which may or may not contain other economic metals. Reference may be made to the accompanying drawings in which Fig. 1 is a longitudinal section, showing the combined roasting and smelting furnaces; Fig. 2 the corresponding cross section; Fig. 3 a general diagrammatic flow sheet in vertical section; including a diagrammatic section of a modified arrangement between the roasting and smelting furnaces, in which the ore, as also the settled dust, is fed directly from the roasting furnaces into the sides of the smelting furnace.

In the drawings 1 is a shaft, or reaction chamber, furnace, which will vary in dimensions to suit the conditions. For small capacities it might be two by four feet in cross section and 50 feet high. For very large capacities, to correspond with the largest reverberatory smelting furnaces, it might be ten by fifty feet or more in cross section and from one hundred to two hundred feet high, to get the quick and full roasting effect of the ore showered through it. Once the roasting furnace is equipped to convey the ore to the top of the shaft, the difference in cost, both of construction and operation, between a high and low shaft is comparatively small. The principal expense is at the top and bottom. A fairly high shaft is therefore ordinarily the best.

At the top, preferably at the ends of the narrow sides if the shaft is rectangular, are oppositely positioned combustion chambers 2 for heating the upper part of the shaft, or reaction chamber, with gas, oil, or pulverized carbonaceous fuel or sulphides. The fuel is intimately mixed with the air as it is injected into the combustion chamber, so that the temperature of the combustion chamber may be regulated as desired, and the ignition of the fuel will be instantaneous. The hot gaseous products of combustion, together with the ignited sulphides flow into the shaft. When the shaft is sufficiently heated the carbonaceous fuel may ordinarily be dispensed with, although it should always be available to control the temperature of the furnace as necessary or desired. The object is to maintain the upper part of the shaft at a rather high temperature so that fine ore showered into it, either through the combustion chamber 2 or through the ore distributor 3, will be instantly ignited and give the ore particles as long a time as practical for oxidizing or other reactions before the ore reaches the bottom of the shaft. The ore distributor 3 showers the fine ore, as nearly as practical, uniformly through the shaft. Air, other gas, oil, or pulverized carbonaceous fuel, may be introduced with the finely divided ore.

The bottom of the shaft may communicate directly with a reverberatory smelting furnace, as shown, or, if desired, other means may be used to transfer the hot roasted ore from the bottom of the shaft roasting furnace directly to the interior of the smelting furnace, should smelting be the next step in the general treatment of the ore. The bottom of the roasting furnace is provided with an air box, or tuyères, 4, so that gas may be introduced into the hot ore, or into the bottom of the shaft, to assist in completing the reactions desired.

5 shows the shaft outlet flues, in the lower part of the furnace, which communicates with a dust chamber 6. The dust chamber is preferably arranged with a sloping bottom 7 so that the dust, settled in the dust chamber, will automatically flow by gravity back into the shaft of the roasting furnace, and flow, with the rest of the roasted ore, into the smelting furnace. Located within the dust chamber 6 are pipes 8, communicating with the blower 14, through which gaseous fluid may be passed to heat it for use in other steps in the general process. Gas inlets 9 are provided in the upper part of the shaft to bring the reacting gas in intimate contact with the ore as soon as it is distributed in the upper part of the shaft. The gas so introduced also serves to keep the interior of the furnace from getting excessively hot, as compared with the temperature just below it. Other gas inlets, 15, 16, and 17 are provided further down the shaft to provide fresh reacting gas for the highly heated particles of ore in their descent through the shaft.

11 represents a reverberatory furnace in longitudinal section, and 12 a combustion chamber for carbonaceous fuel, such as gas, oil, or pulverized coal, to bring the hot roasted ore to the smelting temperature. The roasting furnace and the smelting furnace are preferably so arranged in relation to one another that the gaseous products of combustion and chemical reactions are separately removed. This may be done by letting a pile of roasted ore accumulate in the smelting furnace so as to close the ore outlet of the roasting furnace, so that the hot ore will flow automatically from the roasting furnace, through the sealed outlet, into the smelting furnace as fast as the ore in the smelting furnace is being smelted; or the flow of hot ore may be regulated by the valve 13 in such a way as to prevent any appreciable flow of gas between the roasting and smelting furnace; or the ore may be introduced intermittently from the roasting furnace into the smelting furnace by means of the valve 13. In either case the outlet of the roasting furnace should be quite large and the regulating valve 13 so designed that it may permit of the flow of lumps or partly fused agglomerate through the outlet. Any other well known feeding device which permits the transfer of the hot ore from the roasting furnace to the smelting furnace, such as a short chain conveyor, without appreciable loss of heat, may be used. Even if the communicating channel between the roasting furnace and the smelting furnace is not sealed, the adjustment between the exhaust of the roasting furnace and the smelting furnace can be controlled or regulated to produce the effect desired.

The operation of the process will now be described. The upper part of the shaft is brought to a reacting temperature with carbonaceous fuel injected with air into the combustion chamber 2. The fuel may be either gas, oil, pulverized coal or fine sulphide ore. The mixture of air and fuel is so adjusted as to give the hot air, or the hot products of combustion in the shaft best suited for the reactions desired. Air, or any other reacting gaseous fluid, preferably heated by passing it through the pipes 8 in the dust chamber 7 is used in the combustion chamber 2, and, preheated reacting gas is introduced into the shaft, through the gas inlets 10, 15, 16, and 17. The reacting gas, introduced at these points, will quickly be heated to the reacting temperature and have its full reacting effect where it is most needed for the ignition and oxidation of the sulphide particles, while at the same time the temperature at the top of the furnace will be kept within easy operative limits.

The raw ore is fed into the upper part of the shaft by means of the ore feeder 3, which is adapted to scatter the ore particles, as uniformly as practical, in the upper part of the shaft, so that it will drop through the shaft in a uniform shower. Other substances, such as fuel, flux, or reacting gas, may be introduced with the ore. The fine particles of sulphide ore, introduced into the highly heated oxidizing atmosphere, will be brought almost instantly to the flashing temperature, and start downwardly with the gaseous atmosphere in the shaft. Air or other gas may be introduced through the gas inlets 15, 16, and 17, to supply the oxygen necessary to continue the oxidation of the sulphide particles to the bottom of the shaft. Most, or practically all, of the sulphur will be eliminated before the ore reaches the bottom, depending largely on the height of the shaft. The ore and the gas flow concurrently downwardly to the gas outlets 5, where the gas, or fume, passes into the dust chamber 6. The roasted ore settles in a loose form in the bottom of the shaft, where it may be subjected to further treatment with air or other gas introduced into it through the gas inlets 4. The hot ore particles may be partly fused, and this produces a porous mass which is desirable for smelting, or perhaps for any other preliminary heat treatment.

The ore and furnace gas, while flowing concurrently downwardly, will not descend at the same rate; the ore will descend much faster than the gas, and there will always be cross-currents of gas within the shaft so that all the ore particles will always be surrounded and supplied with the highly heated reacting gas. Under such conditions the reactions can be quickly completed. The ore particles, having a downward impetus, have a certain inertia to carry them by the gas outlets to the bottom, while at the same time the gas flows into and through the flues, or oulets, and into the dust chamber. This helps to minimize the dust carried into the dust chamber with the gas current. The upper part of the dust chamber, or chambers, has a very much greater horizontal area than that of the furnace shaft; in ordinary cases from ten to thirty times greater, so that all but the very finest dust will settle out in the dust chamber, and will be automatically returned, by gravity, to the lower part of the shaft, below the violent action of gas currents. The roaster gas gives up enough heat to the air pipes in the dust chamber to make handling of the gas issuing from the dust chamber easy and practical for further treatment, either for heat recovery or for precipitation of dust or volatilized values. By means of the mechanical exhausters 20 the amount of air or gas passed through the furnace shaft can be closely regulated.

The temperature of the gas in the roasting furnace, as also the temperature of the roasted ore, may be assumed to be from 1200 to 1500 deg. F. If the higher temperature is greatly exceeded, fusion may occur and give trouble by the ore adhering to the sides of the furnace, or perhaps form agglomerates at the bottom. On the other hand, the sides of the furnace may be cooled or any other means may be used to avoid fused particles from adhering to the sides of the furnace, and the temperature may be made as high as desired, even to liquifying the ore and letting it run into the smelting furnace as a liquid.

In the ordinary operation of the roasting furnace, both the gas and the ore may be assumed at a temperature of from 1200 to 1500 deg. F., which is considerably below the effective smelting temperature, or about 2400 deg. F. In addition to the relatively low temperature of the roaster gas, as compared with the temperature of the smelting furnace, the roaster gas is usually saturated, or nearly saturated, with sulphur dioxide and may contain a large amount of carbon dioxide. There is very little oxygen available, either for chemical reaction with the ore in the smelting furnace or for the production of heat from sulphides or carbonaceous fuel. It is therefore preferred to eliminate the useless and harmful roaster gas from the smelting furnace and, through heat interchangers, heat a smaller volume of fresh air for use in roasting or smelting. Such a procedure saves heating the immense volume of useless roaster gas from a temperature of from 1200–1500 deg. F. to 2300–2400 deg. F. before effective smelting can take place in the smelting furnace, which would be the case if the roaster gas were allowed to flow into the smelting furnace with the hot roasted ore. Since the volume of gas going through the smelting furnace is greatly reduced by excluding the roaster gas in smelting the highly heated roasted ore, the draft in the smelting furnace will be correspondingly less, and the dust produced in the smelting furnace will be reduced to the minimum.

It is preferred to retain a mass of the roasted ore in the bottom of the roasting furnace and feed it into the smelting furnace in a regulable stream. This may be done by means of a valve or ordinary feeder. The valve or the feeder should be so arranged that lumps or agglomerates formed in the roasting will not impede the operation. The valve will ordinarily be adjusted to permit the required amount of ore to flow from the roasting furnace into the smelting furnace while at the same time prevent the flow of an appreciable amount of gas from one furnace to the other; in the event of agglomerates tending to clog the passage, the valve may temporarily be opened wide. A mechanical feeder will crush the porous agglomerates.

In the production of concentrates, especially by flotation, there is always produced a relatively small amount of extreme fines of low specific gravity, slimes, or colloids, which interfere seriously with filtering, drying, roasting, and to some extent with the smelting. The slimes also make it difficult to get a uniform mixture for any purpose. In drying concentrate containing slimes, lumps are formed, which are not easily disintegrated sufficiently for the purpose of showering fine ore through a reacting gas in a shaft furnace.

In the operation of this process, especially in the treatment of copper ores, it is ordinarily desirable to separate the slimes from the sands by water classifiers ordinarily used in fine grinding ore for concentration. The overflow from the classifiers may be set to remove only the finest and lightest particles, or colloids, and the sands with the slimes removed, no matter how fine the sands may be, give an excellent product for shower-roasting in a shaft furnace. The dust produced in roasting and smelting operations is usually from two to twelve per cent of the ore treated. Most of this dust is very fine and of relatively low specific gravity. Most of its comes from the roasting furnace. If, therefore, the separation between sands and slimes is made by wet classification, either during or after concentration, of an amount represented by the dust produced in roasting and smelting, or, say, from five to ten per cent, the separation would be largely on a gravity basis: that is to say, the fines or slimes that would produce almost all of the dust would be removed by the wet classification, and the high specific gravity fines would pass through the shaft furnace without making much dust, and the small amount of dust produced from roasting the sands, passing into the dust chamber, would easily settle in the dust chamber and would be returned by gravity to the roaster shaft. There would be little or no sulphides in the roaster dust, always found in the dust resulting from ordinary roasting operations, because no particle of ore can escape from the roaster shaft without having first traversed almost the entire length of the shaft in a highly reacting atmosphere. If the particles of sulphide are fine, similar to that of coal dust firing, the oxidation of the sulphide will be almost instantaneous, especially if introduced with air through the combustion chamber at the top of the shaft. It is preferred to introduce as much of the fine ore as practical through the combustion chamber.

In preparing the sands for roasting, the wet or merely dewatered sands are mixed to give a uniform product. With the slimes removed from the sands neither filtering nor drying will ordinarily be necessary; deslimed concentrates are easily dewatered without filtering. The sands preferably mixed to give uniformity and looseness, are fed into the roaster shaft. Carbonaceous fuel and flux may be added to the sands. At the high temperature in the upper part of the roaster shaft, which may be as high as necessary, the moisture of the sands is almost instantly evaporated and the sulphide particles immediately flash to incandescence; the oxidizing reaction continues until the sulphur is practically eliminated, or removed within the desired limit for subsequent smelting. The elimination of the sulphur should be quite low; lower than that necessary for matte requirements when all of the concentrate is roasted for smelting, because the slimes are preferably charged into the smelting furnace wet and raw, and will ordinarily contain most of the sulphur for matte requirements. If it is desired to smelt to white metal, concentrated copper sulphide, or blister copper, instead of the ordinary matte for converter refining, the sulphur in the sands and in the slimes, roasted or unroasted, should be correspondingly low. Since the amount of dust produced by this process will be exceptionally low, and since all of the roasted ore will have its sulphur largely eliminated, the amount of slimes may be kept quite low. The general idea would be not to remove any more slimes or fines in the wet classification than the dust produced in ordinary roasting in a multiple hearth furnace. This could ordinarily be regulated so as not to exceed from five to ten percent of the total concentrate.

The amount of dust escaping from the roasting furnace will be very small as compared with that of roasting in ordinary multiple hearth furnaces, and the dust resulting from smelting the wet raw slimes will also be small as compared with smelting the dried or roasted slimes with the sands. The slime, removed from the sands by ordinary water classification, relatively small in amount, is filtered and charged wet and raw into the smelting furnace, preferably at its sides and intermediate the charging of the roasted sands. Roasting of the slimes will not ordinarily be necessary, because through the removal of the sulphur from the sands in excess of that necessary for matte requirements, the raw slimes can be adjusted to give the best conditions of sulphur for matte, concentrated copper sulphide, or blister copper. A certain amount of sulphur is always eliminated in smelting.

In the ordinary smelting or fine ore or concentrate, there is a great disadvantage in drying the ore, either during or preparatory to roasting, and in bringing cold raw or roasted fine ore to the smelting temperature after a mass of the ore has been delivered into the smelting furnace. Drying wet concentrate in a mass is usually impractical, and stirring and heating the ore is slow and expensive. Similarly in smelting; if a mass of fine ore is delivered into a reverberatory smelting furnace the heat cannot readily penetrate into the interior of the mass, and hence considerable excess fuel and time are required to bring the charge to the smelting temperature, especially if the fine ore is charged cold and sometimes wet.

The most effective way to dry, heat, or roast ore is to shower it through a highly heated atmosphere, which permits all of the ore particles to be completely surrounded by a rapidly changing atmosphere. The heated atmosphere at the top of the shaft or in the combustion chamber might conveniently be as high as 1800 deg F., or even higher, because the evaporation of water consumes considerable heat, although the fuel consumption will usually be less than that required in ordinary drying. Ten pounds of water have about the same cooling effect in a roasting furnace as one thousand cubic feet of cold air. Even with ore low in sulphur, in which the elimination of sulphur may be unnecessary, there would still be a great advantage in treating the ore as described, because it would be the cheapest way to eliminate moisture and volatile matter and bring the ore to the highest practical temperature preparatory to smelting. If the ore contains considerable sulphur, as usual in sulphide concentrates, carbonaceous fuel will ordinarily be unnecessary in roasting, except to bring the roasting furnace to the reacting temperature. By the method described the capacity of the smelting furnace could easily be doubled with the same or reduced fuel consumption per unit of charge, as compared with charging the ore cold and some of it wet. The capacity might possibly be trebled.

The flow diagram, Fig. 3, shows a preferred arrangement of the process for large scale operations. The roasting furnaces are arranged longitudinally with the smelting furnace and the hot roasted ore is delivered, as usual, into the smelting furnace along the side walls. The roaster shafts may be designed as disconnected units, or as two long narrow units with the necessary number of feeding and discharge devices arranged along the top and bottom. The dust chambers are arranged transversely of the smelting furnace and of the roaster shafts. Roasting and smelting installations of unit capacities ranging from 500 to 2000 tons of ore per day would be simple in design and construction and could be housed in a simple convenient building.

If reacting gas is introduced into the accumulated mass of ore in the bottom of the shaft, it will usually be desirable to maintain a reacting temperature in the mass. This may be done by passing the reacting gas through an electric furnace before passing it through the hot ore, by means of which the volume and the temperature of the gas may be easily controlled.

By intimately mixing the finely divided ore with air and usually with carbonaceous fuel and injecting it into the combustion chamber, the ore is instantly ignited, and the ignited ore, issuing from the combustion chamber into the shaft, is under intense reaction conditions for the entire height of the shaft, and hence the roasting is much more effective than when the ore is introduced directly into the shaft. If the cold ore is introduced directly into the shaft ignition may not take place until some or all of the ore particles have descended for some distance, and hence the time of roasting is greatly shortened and the roasting efficiency is impaired. If as much of the ore as practical is passed through the combustion chamber into the shaft, the combustion chamber may be heated to any desired temperature to get practically instantaneous ignition, whereas, it is difficult to bring the atmosphere of the shaft to the high temperature necessary for practically instantaneous ignition of the ore, or to bring it to incandescence. Besides the high temperature desired in the combustion chamber would usually be harmful in the shaft.

If the process is to be used for the reduction of oxidized ores, as for example, the reduction of finely divided non-magnetic iron oxide to make it magnetic—to convert, say, limonite and hematite into magnetite or sponge iron—the ore mixed with fuel is injected into the combustion chamber, where it is immediately brought to incandescence, and the hot ore and the hot products of combustion are then ejected from the combustion chamber into the highly heated reducing atmosphere of the shaft furnace, or reacting chamber, where the non-magnetic oxide is reduced to the magnetic oxide, and some may be reduced to sponge iron. Further reduction may be made by accumulating a mass of the hot reduced ore in the bottom of the shaft, and passing a highly heated reducing gas through the accumulated mass. The reducing gas may be heated to the most effective temperature by means of the electric furnace or otherwise, which will usually be between 1652 and 1832 deg. F. (900 and 1000 deg. C.) or over, and the reduction may be carried as far as to the complete reduction of the oxide to sponge iron. If reduced to sponge iron, the highly heated sponge iron may be charged direct, without cooling, into a melting furnace. Reduction of iron oxide takes place fairly quickly in the presence of a highly heated energetic reducing gas, such as carbon monoxide, coal gas, water gas, natural gas, or hydrogen. The reacting gas introduced into the accumulated mass of hot ore should be at least as hot as the ore to effectively carry out the reducing reactions, and the temperature of the accumulated mass of ore should not be less than 1562 deg. F. (850 deg. C.).

If desired, the ore may be dried before roasting by feeding it on the dust chamber roof, and stirring it with the conveyor 21, and delivering it into the ore bin by means of the elevator 22.

In the conversion of finely divided iron oxide into magnetite, all of the ore will be converted into magnetite, because the ore as showered through the shaft will descend with the highly heated atmosphere, and no ore can escape the reducing action, which, on instantaneous ignition in a highly heated reducing atmosphere, is rapid.

Referring to Fig. 3. In separating the hot ore from the hot gaseous products of combustion in the shaft furnace, at a temperature, say, of from 1000 to 1800 deg. F. (538 to 982 deg. C.), and delivering the hot ore into the smelting furnace which is at a temperature, say, of from 2300 to 2400 deg. F. (1260 to 1360 deg. C.), to smelt it, a great saving has been made in eliminating the roasting furnace gas from the smelting furnace, but an additional saving can be made by injecting the hot roasted ore from the shaft into the smelting furnace with reacting fluid, such as air, gas, or oil, with, or without, pulverized carbonaceous fuel, such as coal or coke. The mixture of air, fuel, and hot ore, showered, or sprayed, into the hot smelting furnace, is quickly, or immediately, brought to the smelting temperature with the greatest economy of fuel, and with greatly increased furnace capacity over the usual method of charging a mass of the ore into the smelting furnace and then bringing it to the smelting temperature. The hot injected ore is sprayed or scattered through the hot smelting furnace atmosphere, and most of it is liquified before it reaches the top of the charge in the furnace; the highly heated coarser sands, not so scattered, will settle along the side walls to act as a protection for the refractory lining. If the slimes are separated from the sands before roasting, as described, there will not be much dust resulting from this method of procedure. The hot ore can be injected along the sides of a large reverberatory furnace, corresponding with the present method of introducing the charge in masses along its sides. Pulverized flux may be introduced with the air, combustible, and ore.

If it is desired to inject the hot ore from the roasting furnace with an air blast into the smelting furnace, it may be done as shown in Fig. 3, in which the ore, at as high a temperature as practical, flows from the roasting furnace on a slight projection in the smelting furnace and then injecting and scattering the hot ore into the smelting furnace with an air blast from the blower. Fuel, such as pulverized coal or a hydrocarbon, may be mixed with the air, as shown. The hot air from the heat interchanger pipes 8, Fig. 1, will ordinarily be used for this purpose.

I claim:

1. A process comprising, treating sulphide ores of metals to produce sand and slime concentrates, showering the sands through a shaft furnace in the presence of a reacting gas heated to a reacting temperature, and smelting the roasted sands with the raw slimes.

2. A process comprising, subjecting finely divided ore to wet classification to separate the slimes from the sands and roasting the sands by showering them through a shaft furnace in the presence of a reacting gas heated to a reacting temperature.

3. A process comprising, treating ores to produce sands and slimes, separating the sands from the slimes, showering the sands through a shaft furnace in the presence of a reacting gas heated to a reacting temperature, accumulating a mass of the hot roasted sands, and introducing a reacting gas into the hot mass of accumulated sands.

4. A process comprising, subjecting finely divided sulphide ore to wet classification to produce sands and slimes, roasting the sands, introducing the roasted sands at spaced intervals into a reverberatory smelting furnace, and introducing the slimes at spaced intervals intermediate the sands.

5. A process comprising, showering finely divided sulphide ore through a reacting atmosphere heated to reacting temperature, separating the hot ore from the hot gaseous products of the reactions, and injecting the hot ore with gaseous fluid into a smelting furnace.

6. A process comprising, roasting finely divided ore, separating the hot ore from the hot gaseous products of the reactions, and injecting the hot ore with air and a combustible into a smelting furnace.

7. A process comprising, treating copper sulphide ore to separate the sands from the slimes, showering the sands through a reacting gas heated to the roasting temperature in a shaft furnace to eliminate sulphur below that desired for matte requirements in smelting, charging the raw slimes and the roasted sands in amounts desired for sulphur in the matte requirements in smelting, and smelting the charge of roasted sands and raw slimes.

8. A process comprising, injecting finely divided ore and gaseous fluid into oppositely positioned combustion chambers communicating with a shaft furnace to bring the ore to the reacting temperature, ejecting the hot ore from the combustion chambers into the shaft furnace, and showering the hot ore through the shaft.

9. A process comprising, roasting finely divided sulphide ore, separating the hot ore from the hot gaseous products of the roasting, heating gaseous fluid, and injecting the hot roasted ore with the hot gaseous fluid into the hot atmosphere of a reverberatory smelting furnace and smelting it.

10. In a shaft roasting furnace, means for showering finely divided ore through the shaft, gas inlets at the sides of the shaft, and sloping surfaces above the gas inlets adapted to throw the descending ore next to the walls of the shaft toward the middle of the shaft.

11. A process comprising, treating sulphide ore of metals to produce sulphide concentrate, separating the slimes from the sands of the concentrate, and roasting the deslimed sands by showering them through a shaft furnace in the presence of a reacting gas heated to a reacting temperature.

12. A process comprising, showering finely divided ore through a shaft furnace in the presence of a reacting gas heated to a reacting temperature, passing the gas downwardly through the shaft with the ore, withdrawing the gaseous products of the reactions from the lower part of the shaft and introducing them into the lower part of a dust chamber, expanding the volume of gas in its ascent from the gas inlet toward the gas outlet in the dust chamber to settle the dust, and returning the settled dust by gravity to the shaft.

13. A roasting furnace comprising, a rectangular shaft having opposite external sides exposed to the atmosphere, dust chambers alongside of the other opposite sides communicating with the shaft, means for showering finely divided ore through the shaft to roast it, means for withdrawing the gaseous products of the roasting reactions from the shaft into the dust chambers to settle the dust, and means for returning the settled dust to the shaft by gravity.

14. A roasting furnace comprising, a rectangular shaft having opposite external sides exposed to the atmosphere, dust chambers adjacent the other opposite sides communicating with the shaft, means for introducing reacting gas into the shaft through the exposed side walls of the shaft, means for showering finely divided ore through the shaft to roast it, means for withdrawing the gaseous products of the roasting reactions from the shaft into the dust chambers to settle the dust, and means for returning the settled dust by gravity to the shaft.

15. A process comprising, treating sulphide ores of metals to produce sand and slime concentrates, showering the sands through a shaft furnace in the presence of reacting gas heated to the reacting temperature, and smelting the roasted sands with the slimes.

16. A process comprising, subjecting sulphide flotation concentrate to wet classification to separate the sands from the slimes, separately dewatering the sands and slimes, and then subjecting the sands and the slimes to pyrometallurgical treatment to recover the metals.

17. A process comprising, subjecting sulphide flotation concentrate to wet classification to separate the sands from the slimes, separately dewatering the sands and the slime concentrate, and then smelting the sands with the slime concentrate.

18. A process comprising, subjecting sulphide flotation concentrate to wet classification to separate the sands from the slimes, separately dewatering the sands and the slimes, subjecting the sands to heat, charging the heat treated sands into a smelting furnace, and smelting the charge.

19. A process comprising, subjecting sulphide flotation concentrate to wet classification to separate the sands from the slimes, separately dewatering the sands and the slimes, and smelting the dewatered sands with the raw slimes.

20. A process comprising, injecting a mixture of finely divided ore and air into an ignition chamber to bring the ore to the reacting temperature with a reacting gas, ejecting the hot ore and the hot gaseous products from the ignition chamber into a shaft furnace through its exterior side walls, and showering the hot ore through the shaft.

21. A process comprising, treating ores of metals to produce finely divided metal concentrate, showering the finely divided concentrate through a shaft furnace to roast it, separating the hot roasted ore from the hot gaseous products of the roasting reactions, and injecting the hot roasted ore with gaseous fluid into a smelting furnace and smelting the ore.

22. A metallurgical apparatus comprising, a smelting furnace, a shaft roasting furnace on opposite sides of the smelting furnace, means for showering finely divided ore through the shaft roasting furnace to roast it, means for separating the hot roasted ore from the hot gaseous products of the roasting reactions, and means for injecting the hot roasted ore from oppositely positioned roasting furnaces with a stream of gas into the smelting furnace.

23. A process comprising, showering finely divided ore through a shaft furnace to roast it, separately withdrawing the roasted ore and the roaster gas from the roaster shaft, introducing the hot roaster gas into one end of a horizontally elongated dust chamber to settle the dust and impart heat to an ore drier hearth over the dust chamber, exhausting the roaster gas at the other end of the dust chamber, feeding finely divided ore to the drier at the relatively cool exhaust end of the dust chamber, stirring and advancing the ore toward the hotter part of the drier toward the gas inlet end of the dust chamber to dry it, and delivering the dried ore into the roaster shaft through its roof to be showered through the shaft to roast it.

WILLIAM E. GREENAWALT.